United States Patent
Turley

(10) Patent No.: US 6,431,275 B1
(45) Date of Patent: Aug. 13, 2002

(54) INFLATION CONTROL DEVICE

(75) Inventor: Rocky A. Turley, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/619,238

(22) Filed: Jul. 19, 2000

Related U.S. Application Data

(60) Provisional application No. 60/144,486, filed on Jul. 19, 1999.

(51) Int. Cl.[7] .............................................. E21B 33/127
(52) U.S. Cl. .......................... 166/187; 166/141; 277/334
(58) Field of Search ................................. 166/187, 142, 166/181, 141, 387, 177.4, 285; 277/334, 333

(56) References Cited

U.S. PATENT DOCUMENTS

| | | |
|---|---|---|
| 4,614,346 A * | 9/1986 | Ito .............................. 277/334 |
| 4,781,249 A | 11/1988 | Wood |
| 4,897,139 A | 1/1990 | Wood |
| 4,967,846 A | 11/1990 | Wood |
| 5,195,583 A * | 3/1993 | Toon et al. .................. 166/187 |
| 5,205,567 A | 4/1993 | Quinlan et al. |
| 5,327,962 A * | 7/1994 | Head .......................... 166/187 |
| 5,327,963 A * | 7/1994 | Vance, Sr. et al. .......... 166/187 |
| 5,340,626 A | 8/1994 | Head |
| 5,397,618 A * | 3/1995 | Cedarleaf ................... 428/138 |
| 5,469,919 A | 11/1995 | Carisella |
| 5,507,341 A | 4/1996 | Eslinger et al. |
| 5,702,109 A | 12/1997 | Mahin et al. |
| 5,778,982 A | 7/1998 | Hauck et al. |

FOREIGN PATENT DOCUMENTS

| | | |
|---|---|---|
| EP | 0 520 279 A2 | 6/1992 |
| GB | 2258674 A * | 2/1993 |

* cited by examiner

Primary Examiner—Frank S. Tsay
(74) Attorney, Agent, or Firm—Cantor Colburn LLP

(57) ABSTRACT

Inflation control arrangement including a non-oriented continuous strand material bound between concentric layers of elastomeric material in an inflatable tool. Where the continuous strand material is located, inflation will be delayed.

8 Claims, 1 Drawing Sheet

INFLATION CONTROL DEVICE

CROSS REFERENCE TO RELATED APPLICATIONS

This application claims the benefit of an earlier filing date from U.S. Provisional Application Ser. No. 60/144,486 filed Jul. 19, 1999 which is fully incorporated herein by reference.

BACKGROUND OF THE INVENTION

1. Field of the Invention

The invention relates to downhole tools for an oil well. More particularly, the invention relates to performance enhancing devices for inflatable packers.

2. Prior Art

Inflatable packing elements have been used in the downhole environment for an extended number of years for many different sealing operations and other operations. Such packers have been very useful for their intended purposes and are generally reliable to provide a positive seal when inflated. One of the drawbacks of inflatable tools is that they inflate as one unit unless specific actions have been taken to prevent that. One prior art means to create inflation control is to differentially cure the rubber from one end of the inflatable device to the other. Since differential curing is difficult and expensive, it is not preferred. Another means of creating a progressively inflatable packer is to stagger competitive layers of rubber in the construction of the inflatable element. In this type of construction, one end of the packer has relatively few layers of rubber where the other end of the packer will have a relatively large number of layers of rubber. Thus, fluid pressure provided to the inflatable element will expand the areas having relatively fewer layers of rubber first and expand areas having a relatively larger number of layers second.

Although these devices do exist the art is in need of alternative methods for controlling inflation of an inflatable element.

SUMMARY OF THE INVENTION

The invention provides an alternative construction for controlling the inflation of an inflatable element by selectively allowing certain areas of the element to inflate prior to other areas of the element. This is accomplished through the employment of a non-oriented continuous strand mat, preferably of fiberglass although other fibers may also be used, such as carbon fiber, aramid fiber, etc. The mat is embedded in the inflatable material with more fiber being added in areas where additional resistance to inflation is desired and less fiber being added to areas where less resistance to inflation is desired. By carefully regulating the addition of fiber to the inflatable material one can create an inflatable element that will inflate only in selected areas first followed by other selected areas second and so on until all areas of the inflatable element have inflated.

BRIEF DESCRIPTION OF THE DRAWINGS

Referring now to the drawings wherein like elements are number alike in the several FIGURES.

DETAILED DESCRIPTION OF THE INVENTION

Figure 1:
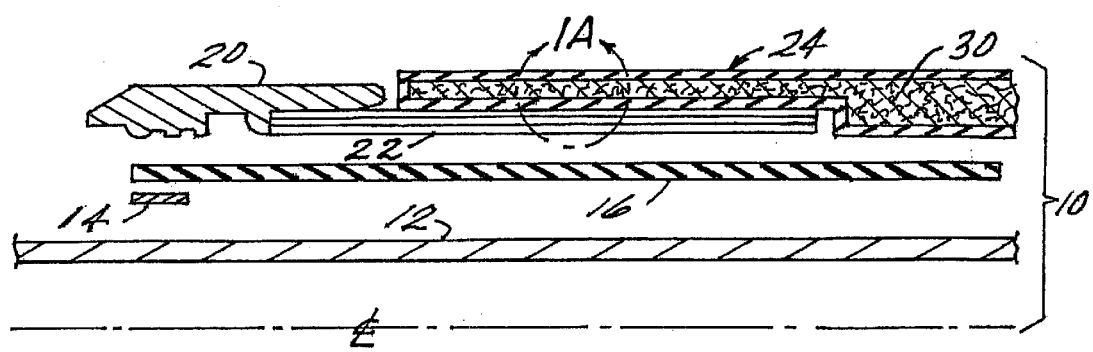
FIG. 1 is a schematic cross section of an inflation device of the invention.
Figure 1A:
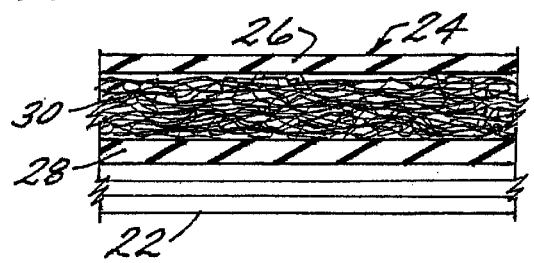
FIG. 1A is an enlarged view of a portion of FIG. 1 indicated by circumscribed area 1A—1A.

Referring to FIG. 1, one or ordinary skill in the art will recognize a section of an inflatable tool 10 comprising mandrel 12; radially outwardly disposed expansion ring 14; further outwardly disposed boot or inner tube 16, rib sleeve 20, ribs 22 and an elastomeric rubber material preferably cover 24. Each of these elements except for the rubber cover 24 conventional. The rubber cover 24 in the invention has been modified from those employed in the prior art. Attention is directed to FIG. 1A where an outer rubber cover layer 26 is illustrated spaced from an inner layer 28. These layers define the exterior surfaces of and bound a non-oriented continuous strand mat 30 such as part no. 4813 available from Vetrotex America located in Witchita Falls, Tex. Preferably, upon construction of the device of the invention the mat is interposed between layers 26 and 28 prior to curing thereof. After laying up each layer 26, 28 and 30 a device of the invention is placed in an autoclave where curing is effected thereby bonding each of the layers to one another. The amount of the material 30 used between layers 26 and 28 and its location will dictate how much pressure is required to expand the outer rubber cover 24 in selected locations. Preferably, three quarter ounce per foot to three ounces per foot of the material 30 is employable to construct the outer cover 24. It is important to note that commercial continuous strand matting is critical to the functionality of the invention since cut strand matting i.e., the commercial type of matting wherein strands individually are 1½ to 2 inches long is not suitable to achieve the benefits of the invention. Standard commercial grade continuous strand matting does provide sufficient adhesive characteristics to the elastomeric elements to derive the benefit of the invention.

By placing a continuous strand matting in selected places along the length and around the circumference of the inflatable tool, noting that some places on the tool may not include any matting at all, selected areas of the tool will be delayed in inflation. The amount of delayed inflation will be commensurate to the amount of material employed since the more material employed, the higher the pressure required in order to inflate the element. Examples of the invention include one end of the inflatable element inflating first and then sequentially inflating towards the other end. This is accomplished by placing little or no mat at the end desired to be inflated first and increasingly more mat toward the other end of the inflatable element. It should also be noted that a smooth variance of the amount of mat over the length of the element is not the only way to create this effect but rather it is also possible to create a similar effect by stepping the amount of mat up from one end of the element to the other end of the element. In other exemplary embodiments of the invention it may be desirable if the center of the element expands first or that each end of the element expand simultaneously and before the center. Matting can again be selectively disposed between layers 26 and 28 at selected areas in order to achieve the desired result.

Figure 2:
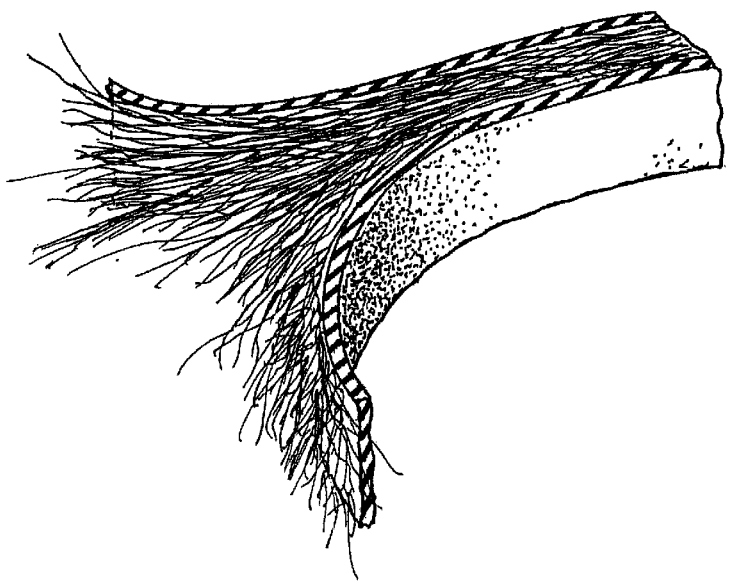
FIG. 2 is a perspective view of a section of the inflatable rubber material of the invention having the non-oriented fiber material exposed therein between two layers of rubber.

In order to illustrate further the critical portion of the invention, the reader is directed to FIG. 2 wherein a section of layers 26 and 28 of the outer rubber cover 24 including material 30 (after curing) have been removed from the inflation device and peeled apart to illustrate the adhesion of the fibers to the rubber layers 26 and 28.

What is claimed is:

1. An inflatable element in a downhole tool comprising:
   a first layer of elastomeric material disposed at said downhole tool;

a second layer of elastomeric material disposed at said downhole tool; and a non-oriented single strand mat disposed between said first layer and said second layer.

2. The inflatable element of claim 1, wherein said mat is of selected thickness at selected areas of said first layer and said second layer.

3. The inflatable element of claim 1, wherein said mat is embedded in said first layer and said second layer.

4. The inflatable element of claim 1, wherein said mat is one of fiberglass, aramid fiber and carbon fiber.

5. A downhole tool with an inflatable element comprising:

a mandrel;

an expansion ring around said mandrel;

first layer of elastomeric material disposed about said mandrel;

a second layer of elastomeric material disposed about said mandrel; and a non-oriented continuous stand mat of selected thickness in selected areas disposed between said first layer and said second layer.

6. The downhole tool with inflatable element of claim 5, wherein said mat is embedded in said first layer and said second layer.

7. The downhole tool with inflatable element of claim 5, wherein said mat is one of fiberglass, aramid fiber and carbon fiber.

8. A method of making a selectively expendable inflatable element comprising:

layering a first layer of elastomeric material with an outwardly positioned non-oriented single strand mat;

layering a second layer of elastomeric material over said mat; and curing said first and second layers of material.

* * * * *